United States Patent
Lasky

(10) Patent No.: US 12,424,204 B1
(45) Date of Patent: Sep. 23, 2025

(54) SPEECH RECOGNITION HEARING DEVICE WITH MULTIPLE SUPPORTIVE DETECTION INPUTS

(71) Applicant: GN HEARING A/S, Ballerup (DK)

(72) Inventor: Michael B. Lasky, Seattle, WA (US)

(73) Assignee: GN HEARING A/S, Ballerup (DK)

( * ) Notice: Subject to any disclaimer, the term of this patent is extended or adjusted under 35 U.S.C. 154(b) by 226 days.

(21) Appl. No.: 18/454,486

(22) Filed: Aug. 23, 2023

Related U.S. Application Data

(60) Provisional application No. 63/400,264, filed on Aug. 23, 2022.

(51) Int. Cl.

| | |
|---|---|
| G10L 15/20 | (2006.01) |
| G06V 40/16 | (2022.01) |
| G10L 13/04 | (2013.01) |
| G10L 15/08 | (2006.01) |
| G10L 15/22 | (2006.01) |
| G10L 15/25 | (2013.01) |
| G10L 15/30 | (2013.01) |
| H04R 25/00 | (2006.01) |

(52) U.S. Cl.
CPC ............ *G10L 15/08* (2013.01); *G06V 40/174* (2022.01); *G10L 13/04* (2013.01); *G10L 15/20* (2013.01); *G10L 15/22* (2013.01); *G10L 15/25* (2013.01); *G10L 15/30* (2013.01); *H04R 25/405* (2013.01); *H04R 25/604* (2013.01)

(58) Field of Classification Search
CPC .............................. G10L 15/20; G10L 15/08
See application file for complete search history.

(56) References Cited

U.S. PATENT DOCUMENTS

| | | |
|---|---|---|
| 5,117,461 A | 5/1992 | Moseley |
| 6,035,050 A | 3/2000 | Weinfurtner |
| 6,336,092 B1 | 1/2002 | Gibson et al. |
| 7,676,372 B1 | 3/2010 | Oba |
| 7,738,667 B2 | 6/2010 | Bramsloew |
| 7,999,857 B2 | 8/2011 | Bunn et al. |

(Continued)

FOREIGN PATENT DOCUMENTS

WO   2004056154 A2   7/2004

*Primary Examiner* — Bryan S Blankenagel
(74) *Attorney, Agent, or Firm* — HSML P. C.

(57) ABSTRACT

A device and method for improving hearing devices by using computer speech recognition of words in the first instance, and then other elements of data acquisition to increase the confidence level that words recognized are accurately identified. If a required predetermined confidence level is reached or the engine(s) with the highest confidence is determined, the recognized/deciphered word from that engine(s) is determined to be the most likely deciphered word and is sent to the device users via a synthesized voice or actual voice. The system adds additional elements of data acquisition including: a) context analysis, b) facial recognition c) lip reading recognition, d) reflected sound wave recognition, e) thermal imaging of mouth expelled air movement to increase the confidence level of lip reading recognition and f) other means. Other modes include translation of foreign languages into a user's ear and using a heads up display to project the text version of words which the computer had deciphered or translated. The system may be triggered by eye moment, spoken command, hand movement or similar.

7 Claims, 4 Drawing Sheets

(56) References Cited

U.S. PATENT DOCUMENTS

| | | |
|---|---|---|
| 8,442,280 B2 | 5/2013 | Qian et al. |
| 9,584,946 B1 | 2/2017 | Lyren |
| 10,276,159 B2* | 4/2019 | Wang .................. G10L 15/22 |
| 10,715,649 B2 | 7/2020 | Kunimoto et al. |
| 10,791,404 B1* | 9/2020 | Lasky .................. G10L 13/04 |
| 10,841,724 B1 | 11/2020 | Tran |
| 11,043,214 B1* | 6/2021 | Hedayatnia ............ G06N 20/10 |
| 2002/0135618 A1* | 9/2002 | Maes ................... G10L 15/24 |
| | | 715/767 |
| 2003/0046062 A1 | 3/2003 | Cartus |
| 2003/0065508 A1 | 4/2003 | Tsuchinaga et al. |
| 2004/0136542 A1 | 7/2004 | Denda |
| 2004/0208331 A1 | 10/2004 | Chalupper |
| 2005/0055204 A1 | 3/2005 | Florencio et al. |
| 2005/0177528 A1 | 8/2005 | Qamar |
| 2006/0036439 A1 | 2/2006 | Haritaoglu et al. |
| 2006/0111899 A1 | 5/2006 | Padhi et al. |
| 2007/0233497 A1* | 10/2007 | Paek ..................... G10L 15/22 |
| | | 704/E15.04 |
| 2010/0034406 A1 | 2/2010 | Fischer et al. |
| 2010/0135511 A1 | 6/2010 | Pontoppidan |
| 2011/0299711 A1 | 12/2011 | Nielsen et al. |
| 2012/0063620 A1 | 3/2012 | Nomura et al. |
| 2013/0142365 A1 | 6/2013 | Lord et al. |
| 2013/0304459 A1 | 11/2013 | Pontoppidan et al. |
| 2014/0052439 A1 | 2/2014 | Rose et al. |
| 2014/0185850 A1 | 7/2014 | Fitz et al. |
| 2014/0278379 A1* | 9/2014 | Coccaro ............... G10L 15/1822 |
| | | 704/202 |
| 2015/0025662 A1 | 1/2015 | Di Censo |
| 2015/0036850 A1 | 2/2015 | Barthel |
| 2015/0120293 A1 | 4/2015 | Wohlert et al. |
| 2015/0139459 A1 | 5/2015 | Olsen et al. |
| 2015/0208956 A1 | 7/2015 | Schmitt |
| 2016/0088404 A1 | 3/2016 | Oshima |
| 2016/0111111 A1 | 4/2016 | Levitt |
| 2016/0157030 A1 | 6/2016 | Odame et al. |
| 2017/0064463 A1 | 3/2017 | Greenberger |
| 2017/0069321 A1 | 3/2017 | Toiyama |
| 2017/0154033 A1* | 6/2017 | Lee ...................... G10L 15/16 |
| 2017/0330560 A1* | 11/2017 | Wang .................. G10L 15/183 |
| 2017/0359666 A1 | 12/2017 | Lyren |
| 2018/0061415 A1 | 3/2018 | Penilla et al. |
| 2019/0028817 A1 | 1/2019 | Gabai |
| 2020/0218094 A1 | 7/2020 | Howell et al. |
| 2020/0403818 A1* | 12/2020 | Daredia ................ G10L 17/00 |
| 2021/0035562 A1* | 2/2021 | Lee ...................... G10L 15/16 |
| 2021/0142789 A1* | 5/2021 | Gurbani ................ G10L 15/26 |
| 2022/0310077 A1* | 9/2022 | Tu ....................... G10L 15/22 |
| 2022/0310096 A1* | 9/2022 | Choi .................... G10L 25/51 |
| 2023/0085433 A1* | 3/2023 | Can ..................... G10L 15/26 |
| | | 704/235 |
| 2023/0360646 A1* | 11/2023 | Coucheiro Limeres .............. |
| | | G10L 15/197 |
| 2024/0038224 A1* | 2/2024 | Sarkar .................. G10L 15/063 |

* cited by examiner

Vocabulary Mapping

| English words | Speaker1 captured data ID | Speaker2 captured data ID | Computer generated |
|---|---|---|---|
| The | 1112 | 1113 | 1114 |
| Be | 2115 | 2116 | 2117 |
| To | 3225 | 3226 | 3227 |
| And | 4022 | 4023 | 4024 |

Fig. 2

Learning/Translational Vocabulary Mapping

| Danish (English words) | Computer generated |
|---|---|
| Den (the) | 1114 |
| Være (to be) | 2117 |
| Til (to) | 3227 |
| Og (and) | 4024 |

Fig. 3

SPEECH RECOGNITION HEARING DEVICE WITH MULTIPLE SUPPORTIVE DETECTION INPUTS

TECHNICAL FIELD

This disclosure relates to a hearing assistive device or aid, such as a behind-the-ear (BTE), in-the-ear (ITE), completely-in-canal (CIC) hearing aid, or a future implanted device, for improving hearing quality for persons with hearing loss and as a language assistive device for hearing unimpaired or normal hearing wearers. In particular, this disclosure is related to supplementary, supportive sources of data which can improve the quality of hearing which a hearing assistive device can provide.

BACKGROUND

In the United States, some basic hearing aids have become unregulated medical devices, meaning that they will no longer need approval from the FDA to be sold. This will introduce a flood of simple hearing aids at very low prices. These devices will be directed to users with minimal hearing impairment. Devices intended for use by severely impaired users are, however, a different class of device and improvements in technology for such users are still needed. This disclosure relates to the concept that the use of multiple forms of data inputs to a hearing assistance device can improve the reliability of the device even if each form of input could be inadequate by itself. This technology is unique from prior technologies, which had to be inherently beneficial to be considered useful. Instead, the cumulative effect of even partially beneficial data, when used with other data, will improve reliability substantially.

Simple hearing aids work primarily by amplifying and conditioning the sound around them to adapt to the wearer's particular hearing condition. This concept has changed little over the years except that such devices have become smaller, more energy efficient, and digital. These devices work quite well for wearers with minimal hearing loss, but not well for those wearers with profound hearing loss. For these users, it is not enough to amplify and clarify. Rather, they need to have a much higher s/n ratio and perhaps even need to have the words they are hearing to be pronounced more clearly and in a voice which is attuned to their hearing loss. In my prior patent, U.S. Pat. No. 10,791,404, (hereby incorporated by reference), I proposed many advanced solutions which don't just amplify sound, but replace it with synthetic sources. Thus, in those solutions, the hearing device itself (including any adjunct support as needed) would determine what words were spoken and would provide a synthesized voice to the wearer, which would be crisp and clear (high s/n ratio). In my '404 patent, I relied upon one source of input data, microphone (sound) data, which was to be converted to discrete words (speech recognition, sometimes referred to as speech to text and then back to speech). I have since concluded that, while this is a significant breakthrough, more can be done to enhance the computer's recognition of the right word beyond merely improving the speech recognition algorithm based on sound alone. I also concluded that the additional sources of data (inputs) do not have to, in themselves, be 100% reliable to still be immensely helpful. They can cumulatively reduce the margin of error and potentially speed up the process if the inputs are handled in parallel.

SUMMARY

This disclosure includes many inventive features. The following is a summary of some of them.

There is disclosed an assisted hearing device for a wearer's use in hearing spoken words of a speaker, the device having any or all of the following elements:
  a. at least one microphone to detect at least one spoken word from the speaker;
  b. a sound reproducing element to provide sound output to the device user;
  c. said device including:
    a. a speech recognition engine configured to create a first output of at least one deciphered word derived from the speaker's spoken word;
    b. a camera and lip reading engine capable of identifying the speaker's lip movements and converting the lip movements into a second output of at least one deciphered word from the speaker's spoken word;
    c. assigning a confidence level to at least one of the deciphered words from the first output, said confidence level corresponding to a predetermined percentage of confidence that the deciphered word from the speech recognition engine is the same word as the spoken word;
    d. assigning a confidence level to the second output; said confidence level corresponding to a predetermined percentage of confidence that the deciphered word from the lip reading engine is the same word as the spoken word;
    e. comparing the confidence levels of the first and second outputs and determining which deciphered word, if any, shall be defined as the chosen deciphered word;
  d. generating a synthesized voice speaking the chosen deciphered word and outputting said synthesized voice to said sound reproducing element, which is hearable by the user.

There is also disclosed a device which, once it deciphers the chosen word, assigns a predetermined weighting factor to each of said outputs and evaluates which deciphered word has the highest confidence level in view of weighting factors. That also means that there can be a confidence factor associated with each deciphered word and a weighting factor associated with each form of input. The factors are predetermined or calculated by artificial intelligence (AI) while processing. The predetermined factors can be created by testing the reliability of many words and testing the reliability of each input engine.

Also disclosed is a device wherein the weighting factor of the speech recognition output shall be greater than that of the lip reading output.

Also disclosed is a device that also includes a thermal sensor associated with the lip reading engine to provide air movement data adjacent to the speaker's mouth and to apply said air movement data to further define the confidence level of said deciphered word of said lip reading engine. Air movement can include air direction, velocity, acceleration, duration, intensity, temperature, and other available measurements of breath.

Also disclosed is a device that includes a context engine which uses the output of received signal data from one or more microphones with or apart from a speech recognition engine, and wherein the context engine compares the prior spoken words with the target or subject deciphered word, to identify a deciphered word with a probability of being the word which the speaker actually spoke. In essence, the context engine is listening to the speaker makes a determination of what the speaker is likely to say in the next moment. The context engine concept is known (albeit poorly), for example, in SMS text typing on a mobile phone. The phone suggests what the next word should be based on prior words. Currently, the phone algorithm is primitive in that it does not look back far enough, and lacks the AI capability of making a high probability guess.

Even so, if the context engine makes one or more guesses, it is often not enough to produce a high probability single target deciphered word.

Using additional engines as described herein can help greatly in reducing the error.

A speech recognition engine which is configured to focus on the sound of the word, without concern over its meaning or context appropriateness, can aid significantly.

Take, for example, the TREE/FREE/THREE conundrum. The words sound much alike but their leading sounds are very different. If the speech recognition engine is configured to focus on the leading, middle or ending sounds, which ever has the best signal to noise (S/N level, the combination of the two engines can be quite accurate.

For instance, if the speech recognition engine determines the leading sound to be an "F" with high confidence, based on S/N data, then the context engine can receive further guidance that the context option most likely starts with an "F".

This cascade of data input, from one engine to another in series, or in parallel with, a comparator, will greatly increase the accuracy of deciphered word.

Also disclosed is a device wherein the context engine reviews prior deciphered words and applies context information to assign a confidence level to deciphered words.

Also disclosed is a device that includes a facial recognition engine associated with the camera for extracting facial information which provides guidance to the speech recognition engine.

Also disclosed is a device wherein dead air between words and parts of words is removed so that the output of the sound reproducing element will tend to be in synchronization with the speaker's words.

Also disclosed is a device that can translate words from one language to another, and that includes searchable stored data corresponding to converted sounds and discrete words captured in the original language and corresponding to the stored data from words generated by a voice synthesizer in the second language, wherein said processor is configured to substitute at least one of the words in the original language with at least one of the corresponding words in the second language from the stored data and output the said second language word to the sound reproducing element.

Also disclosed is a method of providing clearer words to a user of a hearing assistance device that comprises any or all of the following steps:
  a. using a speech recognition engine that processes the sound of spoken words into a plurality of deciphered words and stores said deciphered words into a first data base;
  b. using a context engine that processes previously deciphered words to determine the context of the spoken words;
  c. comparing the deciphered words from the first data base and determining, with the aid of said context engine, if the discrete words from the speech recognition engine have a high probability of being the same words as the spoken words by reaching a predetermined confidence level;
  d. drawing from a second data base of synthesized words, for deciphered words which reach the predetermined confidence level, and replacing at least some of the deciphered words from said first data base with words of like meaning, but generated by a synthesized voice, whenever words of like meaning are available in said second data base;
  e. outputting said replaced words to a sound generator from the device, so that the user will hear at least some clearer synthesized words that replace the original spoken words.

Also disclosed is an assisted hearing device for a user to wear for hearing spoken words, the device having any or all of the following components:
  a) at least one microphone and one microphone array to pick up at least one spoken word;
  b) a sound reproducing element to provide sound output to a device user;
  c) said device including:
    1. the microphone located adjacent to the user and configured to pick up at least one spoken word,
    2. the microphone array being locatable closer to the speaker than the microphone and configured to pick up at least one spoken word of the speaker;
    3. a processor including a speech recognition engine configured to create a first output of at least one discrete deciphered word from the speaker's spoken word from the microphone;
    4. said speech recognition engine also configured to create a second output of at least one discrete deciphered word from the microphone array receiving sound from the speaker's spoken word;
  d) assigning a confidence level to at least one of the deciphered words from the first output, said confidence level corresponding to a predetermined percentage of confidence that the deciphered word is the same as the spoken word;
  e) assigning a confidence level to the second output, said confidence level corresponding to a predetermined percentage of confidence that the deciphered word is the same as the spoken word;
  f) comparing the confidence levels of the first and second outputs and determining which deciphered word, if any, shall be defined as chosen deciphered word;
  g) generating a synthesized voice speaking the chosen deciphered word and outputting said synthesized voice to said sound reproducing element, which is hearable by the user.

There is also disclosure of an assisted hearing device for a user for use in hearing spoken words of a speaker, the device having any or all of the following elements:
  a. at least one microphone to pick up at least one spoken word from the speaker;
  b. a sound reproducing element to provide sound output to a device user;
  c. said device including:
    1. a speech recognition engine configured to create a first output of at least one deciphered word from the speaker's spoken word;
    2. a context engine configured to receive previously deciphered word data from said speech recognition engine and sending said word data into a second output of at least one deciphered word from the speaker's spoken word;
  d) assigning a confidence level to at least one of the deciphered word from the first output, said confidence level corresponding to a predetermined percentage of confidence that the deciphered word from the speech recognition engine is the same as the spoken word;

e) assigning a confidence level to the second output, said confidence level corresponding to a predetermined percentage of confidence that the deciphered word from the context engine is the same as the spoken word;

f) comparing the confidence levels of the first and second outputs and determining which deciphered word, if any, shall be defined as chosen deciphered word;

g) generating a synthesized voice speaking the chosen deciphered word and outputting said synthesized voice to said sound reproducing element, which is hearable by the user.

Also disclosed is a method of providing clearer word sounds to the user wearing a hearing assist device including any or all of the steps, in any order, of:

a. processing the sound of a speaker of spoken words; converting the spoken words from sounds into discrete words and storing said discrete words in a first data base;

b. detecting the lip movements of the speaker and converting such movements into discrete words and storing them in a second data base;

c. assigning a confidence level value to each word stored in the first data base, the confidence level reflective of how many alternative words the processor generated as being a representation of what was spoken, with a lower confidence level being assigned to words which generated more possible alternative words;

d. assigning a confidence level value to each word stored in the second data base, the confidence level reflective of how many alternative words the processor generated as being a representation of what was detected by lip movements, with a lower confidence level being assigned to words which generated more possible alternative words;

e. electing the word with the highest confidence level from the first and second data bases for each spoken word;

f. converting the word with the highest confidence level into a spoken word transmitted by the hearing assist device to the user by drawing from a third data base of synthesized words, replacing the actual spoken word of the speaker;

g. outputting said synthesized word to a sound generator and transmitting said word to the user; so that the user will hear at least some synthesized words replacing actual speaker's words where the synthesized words will be clearer to the user.

Also disclosed is An assisted hearing device for use in hearing spoken words of a speaker, the device having any or all of the following:

a. at least one microphone to pick up at least one spoken word from the speaker;

b. a sound reproducing element to provide sound output to a device user;

c. said device including:

1. a speech recognition engine configured to create a first output of at least one deciphered candidate recognition engine word from the speaker's spoken word;

2. a context engine configured to receive a previously deciphered candidate word from said speech recognition engine and sending said word into a second output of at least one deciphered candidate context engine word from the speaker's spoken word;

d) assigning a confidence level to at least one of the deciphered words from the first output, said confidence level corresponding to a predetermined percentage of confidence that the deciphered word from the speech recognition engine is the same as the spoken word;

e) assigning a confidence level to the second output, said confidence level corresponding to a predetermined percentage of confidence that the deciphered word from the context engine is the same as the spoken word;

f) comparing the confidence levels of the first and second outputs and determining which deciphered word, is to be defined as the chosen deciphered word; and g) generating a synthesized voice speaking the chosen deciphered word and outputting said synthesized voice to said sound reproducing element, which is hearable by the user.

Many other ideas and concepts are disclosed in the remainder of the application below.

A source of supplementary input/information which will help make synthetic word substitution more accurate is monitoring/sensing sympathetic vibrations that mirror the speaker's voice. This can be of other parts of the speaker's body, or object near the speaker.

For example, it is known that the jaw bone is a good source of vibrations which mimic the speaker's voice because the jaw bone carries the sound signal much the same way as a piece of wood is able to do. See U.S. Pat. No. 10,715,649.

Likewise, eyeglasses or other inanimate objects, near the speaker will also reflect sound.

One way to detect these small signal vibrations is to scan the speaker and areas nearby with a scanning laser (obviously of a type which is not dangerous to the speaker). This can be combined with artificial intelligence (AI) to first determine the best place to detect these vibrations.

A camera can be used, such as an eyeglass mounted camera (see US Patent Publication 2020/0218094, for example, or Google Glass®). The same non-invasive technology can be used to identify the speaker's jaw bone location, whether the speaker is wearing eyeglasses and even if a nearby object in the room is rigid enough to reflect sound waves.

Once AI has identified potentially useful zones, a laser or other technology yet to be developed, can scan the zone surface for vibrations. These vibrations can be amplified and convert to words with the same software which is used in the synthetic substitution disclosure in the '404 patent.

With this technique, the computer process will now have multiple inputs which correspond to spoken words. The main data source/engine will preferably remain speech recognition, since it deals directly with the spoken word. Secondary sources deal with more indirect, but still nonetheless valuable sources of adjunct data, such as, a) lip reading data; b) context data; c) facial recognition data; and e) advanced technologies such as brain wave detection, which are not yet ready for use.

Each data source/engine can deliver data, (i.e., decipher its data input into a proposed word(s)) which will, for this purpose, be referred to a deciphered word(s), though they are in fact candidate word(s) for what was spoken. The objective is to use multiple data sources/engines to supply best guess estimate word(s) as that engine's deciphered word(s).

Of course, only one final word must be selected from the various data source's candidate/deciphered word(s) and transmitted to the wearer's ear.

To winnow down the various candidates, one possible technique is to provide a relative reliability score based on the quality of the data received with each candidate's deciphered word.

Reliability scores/percentages in the case of the speech recognition engine could be based on many factors including the s/n ratio and/or the number of candidate words which the engine proposes amongst other criteria.

One simple way of arriving at a reliability score is a sliding scale base on an s/n ratio. In a noisy environment (i.e., low s/n), any deciphered word from the speech recognition engine would inherently be considered suspect and thus have an associated low score. A table of s/n to scores would be drawn upon at the moment the engine finds a candidate/deciphered word. So, in a noisy environment, the word FREE might have a 20% score, while in a quiet environment, the same deciphered word could have a 90% score.

Rather than rely upon speech recognition to determine a single final word better results will be achieved if additional engines provide more candidate-deciphered words. The term "candidate" or "deciphered word" is meant to mean the word (phrase) detected from a speaker and then recognized, even if in part, by the engine with a varying degree of accuracy. A speech recognition engine of known technology can listen to spoken words, and via an algorithm and preferably look up data tables of words and output one or more candidates words as "deciphered words". A deciphered word is not necessarily the right or actual word spoken, but the term is used where an engine/computational device has identified a "guess" of a spoken word and wherein the guess can be later refined, corrected, or rejected by the additional steps of other engines which provide additional basis for confirming or rejecting the accuracy of the guess.

For example, if the speech recognition system generated two deciphered words (FREE and THREE) and it had in its data base, that THREE was a more common word, then THREE would be give a reliability score higher than FREE.

Now adding addition inputs, the comparator can make a more reliable decision based on the predetermined weighted value of other inputs.

For example, a context engine, which reads the prior deciphered words and predicts the next most likely word, could steer the comparator in the right direction.

Now add a lip reading input (together with context or separately). By following the movements of that speaker's lips using lip reading technology, a value input can be added to other inputs. It will be appreciated that even expert human lip readers cannot follow a conversation with high accuracy. In fact, the accuracy is low and limited to some words which provide greater unique lip movement. There are software applications which can do some of the same functions as a human lip reader (see U.S. Pat. No. 8,442,280 to Kim et al. and U.S. Pat. No. 7,999,857 to Bunn et al. and www.sravi.ai) which is an early stage automated lip reading app for the speech impaired (not hearing impaired). But the fact that certain words can more easily be read than others, means that for those "easy" words, a lip reading input, using predetermine weighting/reliability assignments to each word, will increase overall reliability.

Let's assume that TREE, FREE and THREE are pretty easy lip reads. If one puts fingers to the mouth while speaking, it is obvious how the lip movements differ. These words would be listed in a data table with a high reliability score. Then the processor would compare assigned reliability factors from each engine for each result.

Facial recognition is a fairly advanced technology for identity recognition, but not for enhancing speech recognition, yet, it can provide a further supplementary input. For example, if a speaker's face shows stress, and there are two high probability words already detected, the word which provides the greatest association with stress, would be preferred. For example, if the speaker's prior deciphered words are "WATCH OUT. A [TREE/FREE/THREE] IS FALLING.

The speech recognition engine will propose three deciphered results: TREE/FREE/THREE perhaps without a difference in reliability factors. A facial expression engine could detect fear at that moment, given very high reliability to TREE. If a context engine were also used, again TREE might, for example, have the highest reliability of the three choices. The comparator will tally the reliability and weighting factors (facial recognition being, for example, the lowest weighting), and transmit a final selection of deciphered word to be output to the user's ear.

Combining the adjunct of these additional factors to the current amplification technologies and/or the advanced technologies disclosed in U.S. Pat. No. 10,791,404, will allow the words transmitted to the user to be more likely be the right words.

If a high reliability decipher cannot be found, the system could discard all candidate deciphered words, and merely pass the (noisy) actual word to the user.

BRIEF DESCRIPTION OF THE FIGURES

FIG. 2 is a data table showing how words spoken by the designated speakers are paired to synthesized speech.

FIG. 3 is a data table showing how words spoken are paired to synthesized speech where one language is substituted for another, in this case Danish for English.

DETAILED DESCRIPTION

Figure 1:
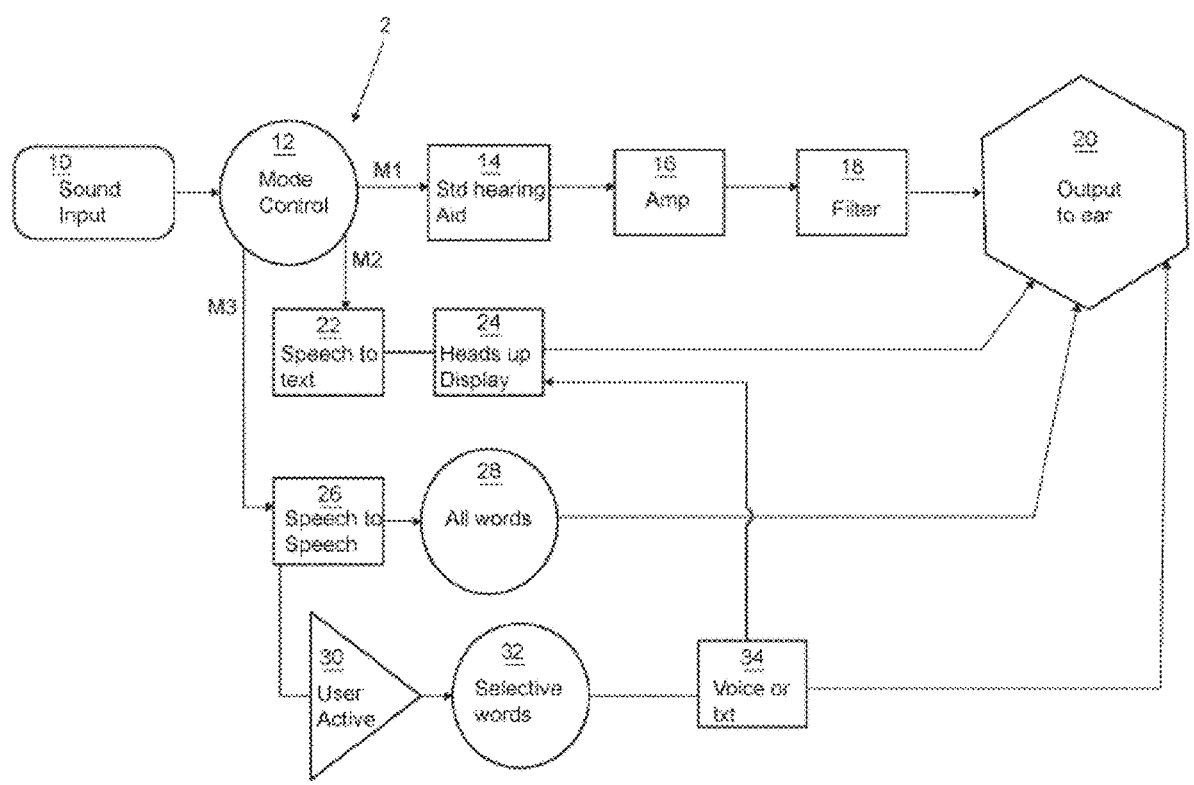
FIG. 1 is a schematic diagram of a system according to this disclosure.

Hearing impaired persons as well as learners of a new language, often have difficulty discerning individual words from the fast flow of words in a sentence. There are many reasons for this, but the solution is often the same: have the speaker repeat the word more slowly and clearly. Unfortunately, that is often impossible in most conversations. The speaker may be far away or speaking from a one way broadcast (such as television/radio) or for many other reasons.

One solution to this problem is to have the assisted hearing device determine the words spoken and convert them to replace spoken words with more clearly pronounced works (better pronunciation), such as text and computer speech and substituted synthetically (computer) generated identical words for the spoken word, only the generated words would have excellent signal to noise (clarity) ratios.

Often a computer can "hear" and convert speech into text/speech to speech more accurately than an impaired listener or a new language learner or a distant sound which the human ear can't resolve. A technique which this disclosure provides is to use computer resolution of a distant sound into a word known in the computer's data table (speech recognition) and then outputting the data table word in synthetic sound and/or text to the hearing aid wearer/user. This works because there will be words which cannot be "rehabilitated" by mere amplification or filtration, due to a low s/n level which is insufficient for a hearing impaired human to discern, but which a computer with current or future software can. As such, the synthetically generated speech, output to the user, will always have a superior s/n ratio.

Furthermore, since it is known that a high percentage of communications are between known parties, special methods can be employed to vastly increase the accuracy and speech recognition.

In one embodiment, the hearing assistive device converts/deciphers some or all of a distant speaker's words (spoken speech) speech into discrete words which can be represented by an ID/code or simply in these text (spelled out) format. Once spoken words have been converted to a code representing deciphered words, prerecorded or computer generated synthesized voice (or prerecorded human voice), can be substituted for all or some of the deciphered speech/words. The words which are ultimately sent to the hearing aid/sound device may contain all substituted words, or some substituted words or a combination of the actual spoken words of the distant speaker (pass through words without interception or recognition because the clarity is sufficient).

There can be many modes in which this system operates.

One mode, is full deciphering of every word. Another, interpretive mode is deciphering of only problematic words which lack the s/n clarify needed for a particular user. This interpreted mode can be switched on selectively, for example, if the wearer is noticing that he/she is missing words, he/she can switch to interpreted mode.

In the interpreted mode, the user may hear some or all of the spoken speech, interspersed with computer substituted words. This can happen in an automated mode where computer makes a determination based on threshold values, such as s/n ratios, or other objective criteria that the spoken speech cannot be amplified and/or filtered to make it clear or "clean" enough for a user to understand. One threshold might be signal to noise. If the s/n ratio is too low, the substitution is made if the computer has been able to create a discrete word from the spoken speech word and there is a synthesized equivalent available in a data table.

Of course, in real time, this processing must be very fast so that user will not have the hearing aid interpreted mode word injection and the live (distant speaker) sound will be out of sync, but there are ways to remedy this.

To gain speed, while faster smaller processors are being developed, processing can take place in the hearing device itself, such as at a server or in the cloud/internet. Furthermore, with artificial intelligence (AI) capabilities applied, each feature of this disclosure will be even more effective at identifying the correct spoken word. This may also introduce some delays, but it should be remembered that, like watching subtitles created in real time on television, which are always out of sync, it is not a serious impediment, at least when compared to not hearing right words. As processing speeds and capacities increase, this problem will diminish.

There are also ways to minimize the sync problem. When a computer generated or stored word is substituted and inserted in the sound output stream to the user the output stream may fall behind the real time spoken words. It is possible however to "catch up" with real time, but removing "dead air" between words and syllables, as known in speech compression with pitch correction technologies currently available. For example, see wikipedia.org regarding time-compressed speech (https://en.wikipedia.org/wiki/Time-compressed_speech). Such compression technologies have never been used for this purpose; rather, they are used only to allow a listener to shorten listening time of a recording.

In this embodiment, the hearing device amplifies and conditions the ambient conversation, but simultaneously, or on user command, listens to the conversations and converts each audible word into computer speech and/or text (interpreted mode). Computer speech may be synthesized or human speech recreated word by word from a data table.

The processing for this conversion can take place in the hearing device itself or preferably in a separate device linked thereto, such as a smart phone or other user carried device, or a wirelessly linked ground station such as a cell tower or Wi-Fi network.

If the user needs constant hearing assistance beyond mere amplification, the system can be in constant interpretive mode and the wearer will only hear synthetic speech, but it will be very clear (i.e., high s/n ratio) and distinct as it does not amplify the ambient conversation, but rather converts it to substituted speech.

In the alternative, the user may activate interpretive mode when needed. In addition, the user may activate it when a particular word or phrase is missed. If the user falls behind in the conversation, the system may remain in full interpretive mode until it has "caught up" to the real time conversation. That is possible because the system can compress speech in known ways such as removing/shortening dead air spaces between words and syllables or in other ways currently known for increasing speech throughput.

In this way, a user can catch a missed word but not lose the flow of the conversation.

The user can trigger interpretative mode by manual (switch) activation, or by other more sophisticated means, such as eye movement, hand gesture, voice prompt, minimum threshold s/n level, etc. For example, a user can trigger interpretive mode by touching the hearing aid, nodding their head, moving a hand, or saying "help" and exit the mode by similar or other measures, such as saying "stop" or touching the hearing aid. A heads up display can also be used so that the user can keep listening while reading the phrase on the display.

A foreign language learner can also benefit from this system. Often foreign words are spoken quickly and without much separation from each other. A learner can activate the interpretive mode to repeat the problematic word in synthetic speech format with the same catch-up capability per above. Additionally, the system could have a translation mode which substitutes another language for that being spoken. This would however require higher processing power since sentence structure between languages is not the same and the translation of a word or phrase would need to take context into account. In such a case, it would be preferable to run the system in translation mode constantly so that the context would be constantly tracked.

That is also true in interpretive mode. Context is helpful in allowing the system to predict the right word when the s/n ration is poor or there are several possible choices. Context suggestion is being done on smart phones with their texting apps.

In some cases, interpretation mode reliability would be greatly enhanced if the system was trained to know the distant speaker's voice. Considering that people communicate more with a limited group more than anyone else, capturing the voice of a limited number of people can have an overall dramatic increase in the reliability and throughput of the system. In known speech to text systems, the user is told to train the system to know its peculiar voice and pronunciation. If the user/wearer has regular conversations with 5 people (aka known speakers), for example, the user could have each of them interact with a voice recording system to pronounce and capture a limited number of words or phrases. Certain words may be known to be problematic for hearing impaired users, such as words between with voiced and unvoiced consonants (example ball and Paul).

Also, foreign languages have words which are difficult to distinguish, and the system can maintain a lexicon of such words. The known speakers can provide several lists of words for a data file. For example, 1) a predetermined number of common words; 2) a number of troublesome words, such as mentioned above; and 3) a list of words which sound different when spoken together (as in French speaking known as liaison). The lists are valuable to speed capture and processing. The lists can also make interpretive mode sound more normal, by providing the known speaker's own voice when in interpretive mode.

Since the system is going to have to convert voice to discrete words, it can output those words with synthesized voice or by text. Text can be used by providing the user with virtual reality augmented glasses or other heads up device, such as Google Glass® spectacles which project text within the sight of the wearer. This would be the equivalent of open captioning or subtitles.

In a complex conversation with several speakers, the hearing device could be set to operate in a unidirectional mode. While the hearing aid is operating in normal prior art mode, it can simultaneously have a directional microphone which the user can direct, such as by turning his/her head or by other means, such as a separate microphone user (such as a smart phone) where and be manually directed toward a particular speaker regardless of what the hearing aid is picking up omnidirectional mode.

Fast processor speed is helpful so that the user is not hearing ambient speech and interpreted speech out of sync, but since this system is most helpful to those who need substantial hearing assistance, even slightly out of sync interpretation will still be a vast improvement. Furthermore, if the user is wearing an in-the-ear assistive device, real time speech can be substantially blocked. By adding side-tone technology as known in the art, the user can avoid shouting in response to a speaker's interpreted voice.

Another aspect of this disclosure is a notification system, where the speaker is notified when the user has switched to interpreted mode. This could be a light source, similar to an "on air" light, which the distant speaker can see. This would warn the speaker to enunciate or slow down, or in the case of a foreign language interpretation, use simpler terminology.

If the user and speaker are communicating by electronic means, i.e. not face to face, the electronic means (such as a smart phone) may have an indicator (audible or visual) which will warn the speaker of these conditions. Imagine speaking to someone in a foreign language and being notified when they are having trouble understanding you. This would give you the opportunity to slow down or make some other change before the user/listener has completely lost your meaning.

In one embodiment the assisted hearing device for a user could have:
   a. at least one microphone to pick up voice sounds from a distant speaker (i.e. a person speaking spoken words);
   b. a sound reproducing element to provide sound output to a user, such as an audio transducer in a hearing aid.

The device may operate in one or mode modes. For example, a first mode being amplification and conditioning of the voice sounds of said speaker and outputting said sounds to said sound reproducing element. This would be a state of the art hearing aid mode. Of course, there will be times when, for certain users, this mode is insufficient to provide clear audible words.

A second mode, which can be a stand-alone or part of the first mode is using the microphone pickup up voice sounds from a speaker (i.e., spoken words) and using a processor and an algorithm known in the art (see for example:
   htttps://en.wikipedia.org/wiki/Speech_recognition and
   https://simple.wikipedia.org/wiki/Text_to_speech
to convert text back to speech) to convert voice sounds to discrete words corresponding to words spoken by said speaker. Once a spoken word is converted into discrete words, they can be output in text or computer-generated sound. Here, one can store these discrete words in a database table and assign them a code. See FIG. 1.

In FIG. 2, common English words are stored in a data table. In reality, the table would contain as many words as possible, but only common ones are shown because they would occur most often. These words are associated with captured (and perhaps digitized) words prerecorded from Speakers 1 and 2. The words in the three columns are the same, but with a different voice. The 4$^{th}$ column shows the computer-generated synthesized words stored in the database, which are used when no speaker's voice was prerecorded or when there is no such word in the database which was prerecorded. When a speaker is talking, the spoken words are heard by the device and converted and matched by speech to text technology, to words in this table. The conversion (and detection) need not be in the hearing device. It could be in a remote device, such as a smart phone carried by the user or even a multitude of prepositioned hearing devices in the space which could be accessed by any device user, once linked. For example, in an auditorium, the speaker's feed could be transmitted to the hearing device by a carrier (such as Bluetooth®) or be converted to text and transmitted to the hearing device, thus saving conversion time.

The device may output entirely the actual spoken words when the clarity level is good enough for the user to rely entirely on that sound feed, but when an occasional word is unclear substitutions from the computer-generated voice or on Speaker 1's voice will be made by using the mapping provided in the database such as shown in the data table. (Note that the numbers shown are merely illustrative and only constitute ID/code numbers for computer retrieval).

The discrete word is assigned a code, and a computer-generated word with the same meaning is matched/mapped to that code. A synthesized voice speaking that word can be generated on the fly when needed or for speed, generated and stored in advance in the database. When needed, the synthesized-voice equivalent word can be sent to the sound reproducing element, which is hearable by the user as a substitute word for the one which was actually spoken. The substitute word will be inherently clearer to the user because it will have a superior signal to noise ratio. It could also be in a dialect better understood by that user. It could also be a translation of the spoken word (see FIG. 2), where the user may trigger a switch which inserts, for example, an English word where the spoken word was Danish or another language.

Since it is known that a hearing-impaired person will have more conversational time with a small group of people than random people, it is possible to pre-record the voices of such a small group (individually) and store such words in a data table (See FIGS. 1 and 2, Speakers 1 and 2).

In such case the stored words, which have preferably been recorded individually, are stored in the data table and mapped to the discrete captured spoken words when processed. The device will make a first determination of whether the speaker is a known pre-recorded speaker (by pattern matching, or manually by user selection), and then use such pre-recorded words of the appropriate speaker until a word is encountered that has not been pre-recorded. The data table will be used to find the computer-generated equivalent. It could also store a list of such words which were not prerecorded but were previously needed in a streaming conversation, and such list could be supplied to that speaker for creating a supplemental recording ranking the most needed words first.

The device would then use the processor to match said discrete words to a database code, and the appropriate synthesized words would be retrieved and used as a replacement for said spoken words.

This substitution could be automated on various criteria such as signal to noise ratio or a switch operated by the user to enable this mode. Actuation could be by user eye movement, head movement, hand gesture, voice etc.

The substituted generated word would preferably replace the existing spoken word, but in a stereo system, it could be supplied to one ear while the other ear hears the spoken word. It could also be displayed to user in text format, on a watch, heads up display, projection, etc.

Depending on the speed of the processor (local or remote), there may be a delay between real speech flow and speech flow with substituted words.

The device may insert a delay in the output of the sound reproducing element so that when said generated replacement words are outputted to said element, subsequent words being sent to the sound reproducing element are delayed to keep the word order unchanged and prevent overlap of sounds.

This could happen if the substitute words are a few milliseconds later than the real word. The remaining spoken words stream needs to be slowed or spaced to allow the late insertion.

To get the user back to "real time" hearing, the delay is gradually reduced by removing dead air spaces between word syllables until said delay is reduced to zero (compression with pitch control).

The device may also have a data look up table for storing ID tags or other indicia corresponding to converted sounds and discrete words generated by a synthesizer and wherein the processor is configured to match converted voice sounds to known discrete words in a look up data table and output said converted voice sound to the sound reproducing element.

The device may also have a data look up table for storing ID tags or indicia corresponding to converted sounds and discrete words of a previously recorded speaker and wherein said processor is configured to match converted voice sounds to known words of a previously recorded speaker in a look up data table and output said known words to the sound reproducing element. These could be the pre-recorded distant speaker's voices and vocabulary.

The device may also be used to translate speech or words in a speech to another language. Often a listener will know many of the foreign language words spoken, but not all. By wearing a hearing assist device, when the speaker is speaking in a first language, and the user desires translation of at least some of said words in a second language, and wherein the device further includes a data look up table for storing ID tags, indicia, corresponding to converted sounds and discrete words captured in said first language and corresponding to ID tags to corresponding words generated by a synthesizer in a second language and wherein said processor is configured to substitute at least one of the words in the first language, with at least one of the corresponding words in the second language from the look up table and output said second language word to the sound reproducing element. The word could also be displayed on heads up display glasses.

FIG. 3 is like FIG. 2 except that prerecorded speaker's words have been omitted. More often the foreign language speaker will not have taken the effort to make the prerecording. In that case, computer generated substitutes are already in the table. In this case, Danish words of the speaker are mapped to computer generated voice of the English equivalent.

For foreign language use, the hearing ability of the user is less commonly an issue. Rather it is the lack of fully vocabulary which is being assisted.

It is also possible to use the device to operate in "wing man/woman" mode. Here a wing man/woman is a person who assists another in knowing the name of people they encounter. Often a person will encounter another who they recognize but can't remember their name or details of their life they need to know. The system can use voice recognition to pattern match to a data base of known voices and notify the user of the speaker's name, either by text (head's up display) or by sound into one of the user's ears. Voice pattern match technology is known in the art. For music, the Shazam® app/software provides such a tool.

So upon user activation, the substitute second language word could replace the unknown word or using stereo, the user could hear both, one in each ear. Using a display, the user could see the translated word but hear the actual foreign language word. The same result could be achieved for idiomatic phrases where the discrete words are known but the phrase has an idiomatic meaning. Activation by a user could translate and substitute the correct phase. If the data base included idioms, the substitution could be automated, so that user intervention is not needed.

The same solution to delay can be used in foreign language translation.

The device can preferably be switchable to a learning mode wherein a speaker can record discrete words into a data base and wherein said discrete words are assigned a first code and wherein said converted words are, to the extent possible, assigned a second code correlated to a first code of a matching word, and when said switch is activated, said recorded words are substituted for said discrete words, thereby providing the user a clearer sounding substitute word in the voice of the speaker.

If there is no word match found from the learned/prerecorded data base, the system can fall back on the presumably larger synthesized voice of said discrete words, which will provide a user with a clearer sounding substitute word, but not in the speaker's voice.

FIG. 1 is a schematic block flow diagram of one embodiment. A hearing device 2 has a sound input 10 typically a microphone or a remote sound pickup link to some device with a mic. In one embodiment, the device has a mode control 12, which could be switch or sensor to switch between modes. In M1 mode 14, normal hearing aid functions, such as amplification 16 and filtering 18 are provided to the output device 20, such as a speaker.

In mode M2, the output from the sound input 10 is processed to convert the spoken word to speech to text 22. If there are multiple voices, this may result in separate speech to text outputs, but they can be differentiated into separate streams by voice print matching, i.e., similar voices are segregated as separate streams. The system would default to the loudest as being the one to further process, but the user could select by switch, between them.

The speech to text conversion 22 can be fed into a heads up display 24 or an earpiece 20, or a separate earpiece from 20 such as with a stereo system with two earpieces.

In Mode M3, the output from the sound input device 10 is processed to synthesized speech 26, which has identified the discrete words in the speech (essentially processing first speech to text and then back to speech though a speech generator). The process matches/maps the spoken words from the speech-to-speech process to synthesized computer generated speech and outputs all words 28 to the output 20 and into the user's ear. In such case, the speech the user hears is not the flowing speaker's voice but a synthetized recreation of all the words. While this may not be as pleasant as the original distant speaker's voice, the s/n clarity ratio of what the user hears is dramatically improved.

A hybrid version of Mode M3 is similar to the above mode, but the user activates 30 when selected words 32 will be sent a synthesized voice to the user or as text to a heads up display 24. The user activation can include a preset automatic detection switch which determines which words are sufficiently garbled (perhaps based on the hearing loss of the user) which needs synthetic substitution. Otherwise, the user can trigger the switch on demand. The delay which is caused can be managed as explained elsewhere herein.

Supplementary/Auxiliary Data Inputs to Improve Reliability of Speech Recognition The aforementioned techniques can substantially improve the quality of speech recognition, but more can be done.

Recognizing that incremental improvement in speech recognition is valuable because it is additive, not just alternative, techniques which even provide a small improvement are useful. After all, though all of these additive techniques are only performable by a specially designed computer system, the user doesn't need to alter his/her behavior to benefit.

These additive techniques include, but are not limited to:
1. A context engine which assisted in word selection based on context of what had already spoken. As exemplary context engine is found in U.S. Pat. No. 9,202,465.
2. Facial recognition for context purposes. For example, if a speaker's face shows stress, and there are two high probability words already detected, the word which provides the greatest association with stress, would be preferred. Dogs, for example, can't understand human speech, but they can clearly detect human moods and will associate expressions and words together to attempt to understand their master. Machines can do much better than that because they can understand words, context, and they additively consider facial expressions as a further indicator of what word has been spoken. See US20180061415 for facial expression recognition.
3. Use of computer-generated lip-reading data with or without thermal imaging enhancement to determine exhalation/inhalation air flows.
4. Use of computer interrogation of vibrations reflected off other objects or the speaker him/herself;
5. Assigning confidence factors to each additional input based on the average reliability of the input source, or the specific reliability of the words detected; and
6. Other inputs for technologies not yet developed (for example, an ability to read the speaker's brain waves, even crudely, to provide further context guidance as to the word spoken).

One configuration of the most reliable hearing assistive device might include all of these technologies, but this disclosure assumes that any combination is an inventive concept in its own right. To save space, the full combination device is discussed but any or all elements can be left out or separately claimed invention.

So in the preferred embodiment, the system would include a hearing assistive device preferably worn by the user, which includes a process (which can be located in the device or remotely connected), at least one microphone or other audio receiving transducer and a speaker or other audio output transducer, positioned as such so that the wearer/user can hear its output.

The processor, which can include computational ability, comparators, memory, data table storage, algorithm processing capabilities, handles the various input functions described herein and below.

First input device/engine/data course is preferably a speech recognition system which takes microphone input and converts it to data in the form of known words, from a data table of known words or by other means known in the art. Examples of such technologies are Google® speech to text, Dragon®, and Mozilla® deep speech which are available as APIs.

To the extent that the speech recognition engine cannot determine with a predetermined level of sufficient certainty that the found word is correct, it may provide several word choices with an estimate of the likelihood that the proposed word is correct (confidence score). The estimate may be derived from several sources, such as known word frequencies in that language, context data which predicts what word would likely come next, or similar predictive algorithms.

A second input may be a context algorithm engine which receives a stream of words from the speech recognition engine (which of course may have errors/incorrect words) and reviews the prior word stream to assign probability scores for the stream of words based, not on s/n ratio, but how likely the next word candidate received from the speech engine is the correct deciphered word. The context engine then proposes the most likely candidate deciphered word(s) and gives such candidate a reliability score. Simple context engines are built into the SMS feature of mobile phones where the engine helps shorten the user's typing by suggesting words based on the context of what has been typed thus far. The predictive data can be compared to the data of the found word from the first input and may support the found word choice or dispute it. If the word is "disputed", (i.e., the confidence level of the first and second input are not high enough to determine a high probability match by not meeting a predetermined threshold) the system may have a default choice, such as the first or second found word, or it may add additional input options as a form of tie breaker. The term "confidence" or "confidence level" is intended to be a predetermined objective measurement against which data is tested again. An engine may produce an output (deciphered word, for example) which is inherently only a guess. The engine can look up in a data table the most likely "sounds-like" words and assign a percentage value to the most probable words in the table which sound like the deciphered word. For example, if the deciphered word sounds like FREE, the data table might list FREE, THREE, and TREE. The confidence level/percentage in the table is predetermined by other inputs, such as context. If the context engine determines that the conversation prior to the deciphered word contained the word "forest", then it would assign a higher confidence level to TREE being the correct deciphered definition. If the lip reading engine gave higher confidence to FREE based on lip movement or air flow, then it would likewise assign a higher confidence level to FREE being the preferred choice for the deciphered word. Therefore, the more inputs, the more accuracy since the confidence levels are additive and the "right" word becomes the one with the cumulative highest confidence level. Using AI will speed this process because the AI engine will know a lot of context information. In some cases, the engines will give conflicting confidence results. In such a case, the system is programmed to give predetermined priority to certain engines over others. In the preferred case, the context engine is presumed to be most reliable. The speech recognition engine may be highly reliable also if the s/n ratio is favorable. The lip-reading engine is the next most reliable, followed by remote microphones, facial recognition, thermal breath analysis, and reflected vibrations. For purposes of this disclosure, other embodiments shall include all combinations of rankings of engines, nor just the one above. For example, in a second embodiment, the lip-reading engine would be presumed to be most reliable and thus have highest weighting/preference over all other engines, so it would have predetermined weighting greater than all other engines. In a further embodiment, the facial expression engine would be presumed to be most reliable and thus have the highest weighting/preference over all other engines. In a further embodiment, the remote microphone engine would be presumed to be most reliable and thus have the highest weighting/preference over all other engines. In a further embodiment, the thermal breath analysis would be presumed to be most reliable and thus have the highest weighting/preference over all other engines. In yet a further embodiment, the reflected vibrations engine would be presumed to be most reliable and thus have highest weighting/preference over all other engines. Note that the context engine is something of a special case since it must receive an input from some other engine to analyze context. Most often that is the speech recognition engine, but it could be, for example, the lip-reading engine which supplies a stream of candidate/deciphered words to the context engine for further analysis.

There are many ways to determine which engine(s) reliability factors would ultimately result in the final word selection for a deciphered word. For example, the highest weighted engine (see above) could always win, or it would win if its reliability factor was greater than a predetermined number; otherwise, the next highest reliability factor would prevail. If the context engine was considered primary (i.e., tended to be the most reliable in scientific testing), and if it determined that the deciphered word was over 50% (or other predetermined percentage) correct (based on scientific test of the engine), it would be the prevailing engine. If its reliability was less than the predetermined percentage, the next most reliable engine would be used. Alternatively, a weighted voting system could be used with some or all engines. Each engine would return a deciphered word and a percentage reliability. That word would get one vote times the percentage. All of the votes would betallied.

Below is an example:

The deciphered word has been determined by the following engines:

Context engine:
  Word: "Three" Known reliability of the context engine: 75% Vote value: 1 vote×0.75=0.75 vote
Lip-reading engine:
  Word: "Free" Known reliability: 25%
  Vote value: 1×0.25=0.25 vote
Breathing engine:
  Word found: "Free" Known reliability 30%
  Vote value 0.30 vote In a system where highest reliability always wins, then the word THREE is outputted to the wearer. However, in a weighted vote system, the word FREE is outputted because it has a higher cumulative weighed vote.

Other permutations are possible, recognizing that multiple fractional votes for a particular word are more reliable than "winner takes all". As a result, adding more inputs (engines) to decipher what has been said produces a mathematically better result.

Furthermore, for simplicity, each engine has been assigned a predetermined reliability percentage based on bench (scientific) tests of the engine in various environments. In this example, 75% was assigned to a context engine. Instead, the percentage could be dynamic. In certain noise environments, different engines may perform better or worse. For example, ambient noise may be extreme in a cold, outdoor environment, but the low temperature makes the detection of warm breath much easier so that engine could have a low temperature reliability which is much greater than in a hot environment or indoors.

A third input may be a lip reading engine which obtains data obtained from a camera or similar input device which is trained on or can find the speaker's lips. Since lip reading is most effective with certain words or syllables which exhibit the greatest lip movement, this list of words can be stored in a further data table. If this third input generates a word from the high reliability word list, it can then be compared to the found word in first and/or second inputs. While many words will be absent from this high reliability lip read list, the ones that do appear should be given significant weight. It is possible that all of the inputs will be calibrated with respect to weighting that they then be directly compared numerically and the winning found word will be the one which the highest score.

A fourth input may be vibrations read off other surfaces including inanimate objects or human body parts (such as the jaw bone). While these signals are very weak, they can be processed to improve s/n ratios. These may be detected in several ways. One method of detection could be a microphone array (one or more microphones) located far away from the user and close to the speaker, which includes a beam (focus) adjustment to find the strongest signal from the speaker. A second method of detection could be a scanning beam, such as a laser, which can read vibrations off any surface. The microphone array could be a wireless device which could be placed near the speaker or even worn by the speaker at the user's request. Because these surfaces are different from the speaker's mouth, they provide a significantly different sound source and may have additional information useful to determine the proper spoken word. The data collected is actual sound information, but differs from the microphone input, in that the reflected sounds may emanate close to the speaker's mouth and may thus be less noisy.

A fifth input may be facial recognition data. For example, if a facial expression shows happiness, then certain words spoken during that expression would be consistent with it. This expression/word data can be stored in a data table and given weightings as explained above.

For example, if the speech recognition engine produces a first deciphered word which, via the lookup data table, would be assigned a confidence score of 10, but the speech recognition engine also deciphers a second (different) candidate work which scores 9 (indicating that that input source proposes two word options), and the same two deciphered words score 7 and 10 respectively from second input source, then the comparator may be configured to output to the speaker, found word 2, rather than word 1 because it scored 19 (10+9) which is higher than the composite score of 17 (7+10).

More sophisticated/nuanced methods of comparing the relative value of various input, aside from a mere summation, are possible. Since each input type is more effective in certain situations or for certain words, the weighting would preferably be dynamic, according the word which needs to be deciphered. The important point is that more inputs, even if each input has inherent weaknesses, will cumulatively provide higher reliability for all words. It is also important to realize that each input source has its own strengths, so the weighting of the input source may be word dependent.

There may be other inputs, which can produce better results, but the technology may not exist at the time of this writing. It is intended that these future technologies are covered by the broad language of the claims since they will be within the realm of additional inputs to hearing assisted devices.

For example, there are already ways to measure waves emanating from the human brain. Long before this technology will be able to "read minds", in which case hearing assisted devices based largely on spoken words will be obsolete entirely, it may soon be possible to detect concepts from brain waves and interpret them more accurately than, say facial gestures. Again, even feeble signals, which can correlate with guidance toward the speaker's intended message is an additive advantage. They would be used in a manner similar to the context engine described herein. Likewise, eye movements or eye expressions may be useful as additional adjunct inputs, such as in support of context detection.

This system can be used to interpret all of the speaker's words or just selective ones (i.e., ones which are problematic to the listener/user). This would be All Words mode. The user can determine which words need to be deciphered by notifying the system of the particular word that needs to be re-spoken. This would be Prompt mode. The system itself could also automatically determine which words are likely to be problematic and make an AI "guess", based on data stored about the nature (f.ex frequency) and magnitude (f.ex amplitude) of the user's hearing loss. This would be Data Table AI Mode. Alternatively, the system can respond to the user's on-demand requests for recognition for a defined period of time and then, using AI, learn when to intervene without user assistance. This would be Learning Mode.

The primary data source will probably be the speech-to-text (a.k.a. speech recognition) computation explained in my '404 patent. Secondary data sources such as, a) lip reading data and b) reflected sound data (jaw bone, eye glasses, other objects, etc.) could also be additive data, supplied to the processor.

Each data source could also supply, in addition to the raw word data, a relative reliability score based on the quality of the data received. In the case of speech-to-text, the reliability score would be based on many factors including the s/n ratio and the number of matching words which the system proposes. For example, if the primary data source, speech recognition engine, generated two words (FREE and THREE) but could not provide a high reliability score for either (for example, if FREE scored above a predetermined threshold/set value and THREE scored below that threshold value, but the predetermined threshold value was unreliably low to make reliable choices, say 50%), then secondary sources would be needed. Inputs from a contact engine could provide the missing confidence level to select a deciphered word candidate over another and then send that candidate to the user by synthesized speech.

In the case of lip reading, it is known that certain words are harder than others to lip read. Beginning consonant pairs b/p, k/g, f/d s/z m/n are always low probability words without context. Let's assume that FREE and THREE are easy to lip read. These words would be listed in a data table as having a high reliability score. The comparator would compare reliability scores and (potentially) weighting factors (i.e., which data sources should be given how much weight or should be favored over others).

For example, speech recognition should normally be given the highest weight/preference because it is the most direct word source, but if lip reading recognition has a high value for a particular word, such as one which involves very distinct lip movements (f.ex the word PRONUNCIATION vs the word IS), then that data source would be given preference/weight, for that word (PRONUNCIATION), even though for a different word, like IS, it might be the opposite. In other words, different inputs have different strengths and assigning their value (weighing) in advance via a data table, takes advantage of that strength.

This inventive disclosure is also usable in settings other than hearing impairment. A similar problem is encountered by learners of a new language. Though their hearing may be fine, they can miss a word altogether because of noisy environments, different accents or simply because the clarity and speed of a native speaker's speech may be very different from what the beginner speaker expects. Furthermore, the same signal to noise (s/n) problems exit for foreign language listening as with hearing impairment. The additional data inputs as explained above apply to such a circumstance as well.

Another related opportunity is to create "super hearing" capabilities in persons not hearing impaired, so that they can hear what is in reality beyond their hearing range (distance and frequency). For example, a worker on a factory floor must have reliable communication with nearby coworkers for safety and workflow reasons. Factory floor environments are inherently problematic for voice communication.

It is known to ascertain the wearer's noise environment and adapt the sound filters dynamically to improve the signal to noise (s/n) ratio. An example of such an endeavor is found in U.S. Pat. No. 7,738,667 issued to Bramsloew et. al. on 15 Jan. 2010. Other learning features of a hearing aid generally relate to the data logging a user's interactions during a learning phase of the hearing aid, and to associating the user's response (changing volume or program) with various acoustical situations. Examples of this are disclosed in, for example, U.S. Pat. No. 6,035,050, US patent publication no. 2004/0208331, and international patent application no. WO 2004/056154, which all include U.S. Pat. No. 7,738,667, incorporated in the below specification by reference for background purposes.

In one embodiment of the disclosure, a hearing assistive device will include technology which will identify the speaker of interest, (ie who is speaking), and follow the movements of that speaker's lips to use lip reading technology as an input in determining or more often verifying what word the speaker spoke.

What these solutions have not recognized, is that lip reading has a much greater value in an auxiliary supportive technology which can synergistically improve the effectiveness of any hearing assistive device.

Realizing that lip reading technology (and lip reading itself by humans) cannot discern words/sounds which don't use significant lip movement to be pronounced (visemes) as a standalone technology, it may only be able to discern 30% of words and that assumes the reader knows the context. Using lip reading as an adjunct to traditional hearing technology can be of great value because it adds accuracy.

Hearers may have difficulty with distinguishing certain similar sounds:

Free vs Three

But these sounds use different lip movements. So while a lip reader app will be unlikely to distinguish these two words without context, a hearing aid device with standard amplification technology can use lip reading technology to assist in determining if the first sound is "F" or "Th".

Combining the adjunct of lip reading to the current amplification technologies and/or the advanced technologies disclosed in U.S. Pat. No. 10,791,404, the speech understood by the wearer will be more intelligible.

In the case of the synthetic substitution technologies in U.S. Pat. No. 10,791,404, where words are first analyzed by a computer to find the closest match look up word and then such look up word is spoken to the wearer in the form of synthetically generated speech, before the word match is finally determined by the computer, the prospectively matched word would be compared to the lip reading data.

If the lip reading data supports the matched word, it is used. If it does not match, then the computer would select the next closest match and test again. If a perfect/logical match cannot be found, the system could discard the lip read input on the assumption that it is in error or at least not helpful.

For example, if the comparator has the highest confidence that the word spoken is THREE, and the lip read data confirms, then THREE is outputted to the speech engine synthetically spoken to the wearer. If the lip read data suggests that the word is FREE, not THREE, then the computer can elect to generate the word FREE if the weighting factor from lip read data (preassigned in a data table) is high enough to overcome the speech-to-text conversion of the computer. Otherwise, THREE is used.

The weighting factors can be generated from a table having data based on the reliability of lip reading of certain words.

Figure 4:
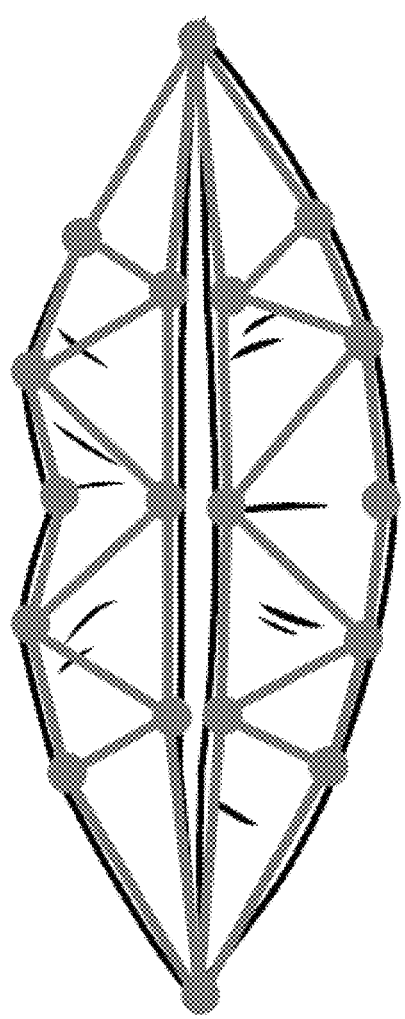
FIG. 4 is a schematic image of lips being scanned by a computer lip reader which assigns marker points on the lips and tracks their movements.

FIG. 4 is an image of a pair of lips with identification points which a computer lip reading engine can use to identify spoken words by tracking the movement of data points and comparing the same to previously collected data.

Figure 5:
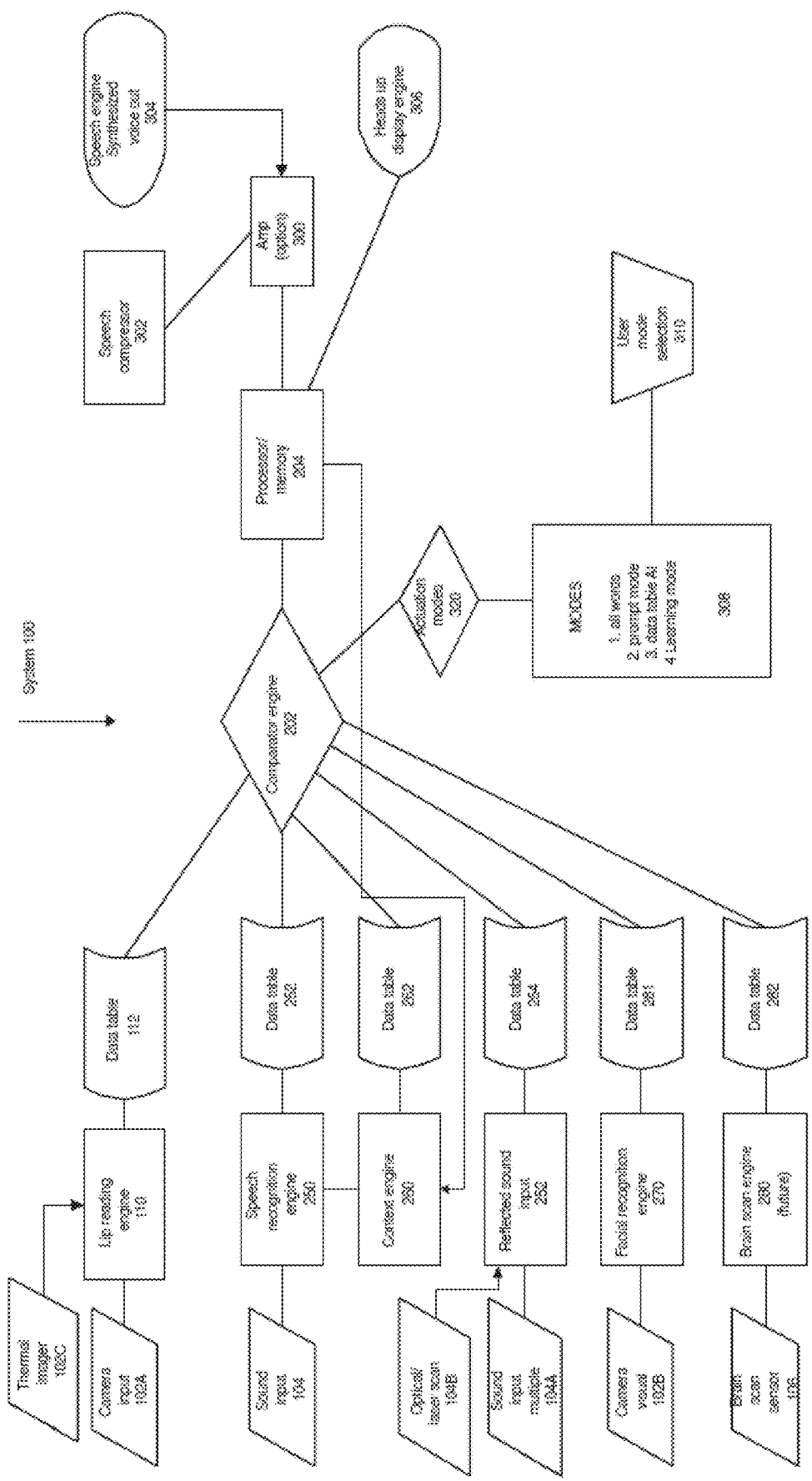
FIG. 5 is a flow chart of some aspects of this disclosure.

FIG. 5 shows a hearing assist system 100 having multiple elements, any or all of which can be combined into a different combination of elements.

Inputs 102A, 102B may be provided by an image/camera, a sound sensor/microphone 104, a microphone array which can be directional focused, or other sensor 106, such as a brain wave sensor of the future.

The camera output 102A may be fed into a lip reading engine 110 which has an associated data storage element or data table 112 with lists of lip readable words with a confidence of accuracy factor, stored in pairs similar to that of FIG. 2.

The output of the lip read engine and data from table 112 are fed to a comparator 202 with a processor system 204 which may include a programmable processor. The comparator 202 is programmed to perform a comparison of data from the source(s) of input and determine, based on predetermined rules and possibly AI, which detected word has been most likely recognized accurately.

Sound input 104 provides input to the speech recognition engine 250 and its associated data table 252, and provides input to the context engine 260 and data table 262.

Context engine 260 receives prior word data from the speech recognition engine to look backward to words already deciphered, thereby determining context, a predictor of whether a deciphered word is accurate. It may have a data table 262 of experiential data supporting context interpretation.

The facial recognition engine 270 and associated data table 281, receive input from the camera 102B which may be the same as 102a, the one used for the lip reading engine. The camera may be in eyeglass frames, a separate camera such as on a smartphone, or other (body) mounted device which tracks the user's movements. It may also receive data from camera 102B which has thermal imaging capabilities as explained herein.

Brain wave or other remote sensor 106 of the speaker is associated with a brain scan engine 280 and associated data table 282 for determining the relationship with the speaker's words. This is future technology not yet ready for implementation.

All of these inputs are fed to comparator engine 202 which, with a preprogramed rule set or AI, makes a final determination of whether the deciphered word is accurate enough to be sent to the speech engine 304 or visual display engine 306.

The comparator 202 can operate in multiple modes 308 as explained herein and the user can select the mode 310 by voice actuation, gesture, or other switching means 320.

The output of the comparator can be fed to a processor/memory for further processing or storage into phrases (and for use in context evaluation). An amplifier 300 such as in a traditional hearing aid, which is frequency adjustable, is an option.

As explained herein, because processing time can un-sync real speech from synthesized speech, a speech compressor 302 for removing dead air can be employed.

Improved Lip Reading (Visual Speech Recognition) Accuracy.

Lip reading, even by computer, is highly inaccurate and depends heavily on context. Humans are limited by what can be discerned by lip movement, but a machine can do much more. In addition to using vector analysis of lip movements to enhance lip reading (AKA Visual Speech Enhancement), see FIG. 4. It is known that certain sounds require specific exhalation (breathing) patterns. Computer lip reading can therefore be enhanced/augmented by thermal imaging and/or the air speed/temperature/time duration/force measurement of exhalation. Thus by combining known data about exhalation with known data about lip movement, lip reading is enhanced. In practice, camera input 102B may also have thermal imaging capabilities using thermal imager 102C. When trained on the speaker, exhalation will result in a plume of warm air, easily distinguishable from ambient air. The volume, velocity and other factors in air temperature differential detection of the plume, will provide another source of useful data correlating lip reading to the spoken word. The system can include a data table 281 correlated to words or groups of words, which will be based on the speaker's air flow, velocity, acceleration and temperature differential emanating from the mouth. For example, if the word THREE has a known air flow pattern and the word FREE has a different air flow pattern, then this information, combined with lip movement data can together provide a higher confidence level for a word than only one such input. Thus, incremental improvement in visual speech recognition accuracy is obtainable merely by adding thermal images to computer lip movement analysis.

This inventive disclosure is also usable in settings other than hearing impairment. A similar problem is encountered by learners of a new language. Though their hearing may be fine, they can miss a word altogether because of noisy environments, different accents or simply because the clarity and speed of a native speaker's speech may be very different from what the beginner speaker expects. Furthermore, the same signal to noise (s/n) problems exit for foreign language listening as with hearing impairment. The additional data inputs as explained above apply to such a circumstance as well.

Another related opportunity is to create "super hearing" capabilities in persons not hearing impaired, so that they can hear what is in reality beyond their hearing range (distance and frequency). For example, a worker on a factory floor must have reliable communication with nearby coworkers for safety and workflow reasons. Factory floor environments are inherently problematic for voice communication.

The term hearing aid/assistive device is meant to be interpreted broadly as any user-worn or implanted device which transmits sound to the user's ear or brain and is not limited thereto. The device only needs an output transducer (speech engine) associated with the user's ear. The rest of the device can be wired or wirelessly elsewhere. The term "engine" is intended to mean a computing device (hardware and/or software), typically having a processor or sharing a processor, with transitory and/or non-transitory memory capable of performing a computation function as defined in the specification.

The description above and its applications as set forth herein are illustrative and are not intended to limit the scope of the invention. Variations and modifications of the embodiments disclosed herein are possible and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. An assisted hearing device for a user for use in hearing spoken words of a speaker in order to decipher the correct spoken words and transmit a synthesized spoken word to a hearing device user, the device comprising:
   a. at least one microphone configured to detect at least one spoken word from the speaker;
   b. a sound reproducing element to provide sound output to a hearing device user;
   c. a voice synthesizer;
   d. a comparator for evaluating outputs;
   e. said device further including:
      1. a speech recognition engine configured to create a first output of engine derived deciphered word candidates derived from hearing the speaker's sequential prior spoken words and a next word; assigning a confidence level to said engine derived deciphered next word candidate; said confidence level being a pre-determined percentage of reliability that the next deciphered word candidate is the actual word spoken; generating a first output to said comparator;
      2. a context engine configured to receive an output from said speech recognition engine of said prior spoken words and computing a likely deciphered word candidate for a subsequent next, yet unspoken, word from the recognition engine, and produce a deciphered subsequent candidate word based on prior spoken words context; assigning a confidence level to said context engine deciphered subsequent candidate word; said confidence level being a pre-determined percentage of reliability of said context engine and generating a second output;
      3. inputting said first and second outputs to said comparator to compare the confidence levels of the first and second outputs and determine which candidate word, is selected for delivery to the device user;
      4. using the voice synthesizer, generating a synthesized voice speaking the selected candidate word and outputting said word via said voice synthesizer to said sound reproducing element, which is thereby hearable by the user.

2. The device according to claim 1 wherein determining which candidate word is selected for delivery includes, further assigning a predetermined weighting factor to each of said outputs and evaluating which deciphered word has the highest confidence level adjusted for said weighting factors.

3. The device according to claim 2, wherein the weighting factor of the speech recognition output is dependent upon the signal to noise ratio of ambient sound at said microphone.

4. The device of claim 1 further including a lip reading engine configured to compute a likely lip reading word candidate for each spoken word and generating a third output with said lip reading word candidate; said lip reading engine engaging further including thermal detecting to provide data of air movement emanating from the speaker's mouth and applying said air movement data to further define a confidence level of said lip reading word candidate of said lip reading engine and generate a third output.

5. The device of claim 4 wherein the context engine has a confidence level greater than said speech recognition engine.

6. The device of claim 4 further including a facial recognition engine associated with the camera for extracting facial expression information and generating a facial recognition word candidate based on a facial recognition and generating a fourth output and wherein said outputs to said comparator compares the confidence levels of the first, second, third and fourth outputs and determines which candidate word is selected for delivery to the device user.

7. A method of providing clearer words to user wearing a hearing assisted device comprising the steps of:
   a. using a speech recognition engine, processing the sound of a speaker of spoken words into a plurality of deciphered words and storing said deciphered candidate words in a first data base;
   b. using a context engine, sequentially, processing previously deciphered candidate words from said speech recognition engine, to determine the context of the speaker's subsequent words and generating context engine candidate words which the context engine determines is the likely next words in context and storing said words in a second data base;
   c. sequentially comparing the deciphered candidate words from the first data base to with likely next words in the second data base;
   d. selecting said words from the first database only to the extent such words are identical to likely next words in the second data base, otherwise selecting words from the second data base the context engine;
   outputting said selected words to a voice synthesizer and thereby to the device wearer.

* * * * *